UNITED STATES PATENT OFFICE.

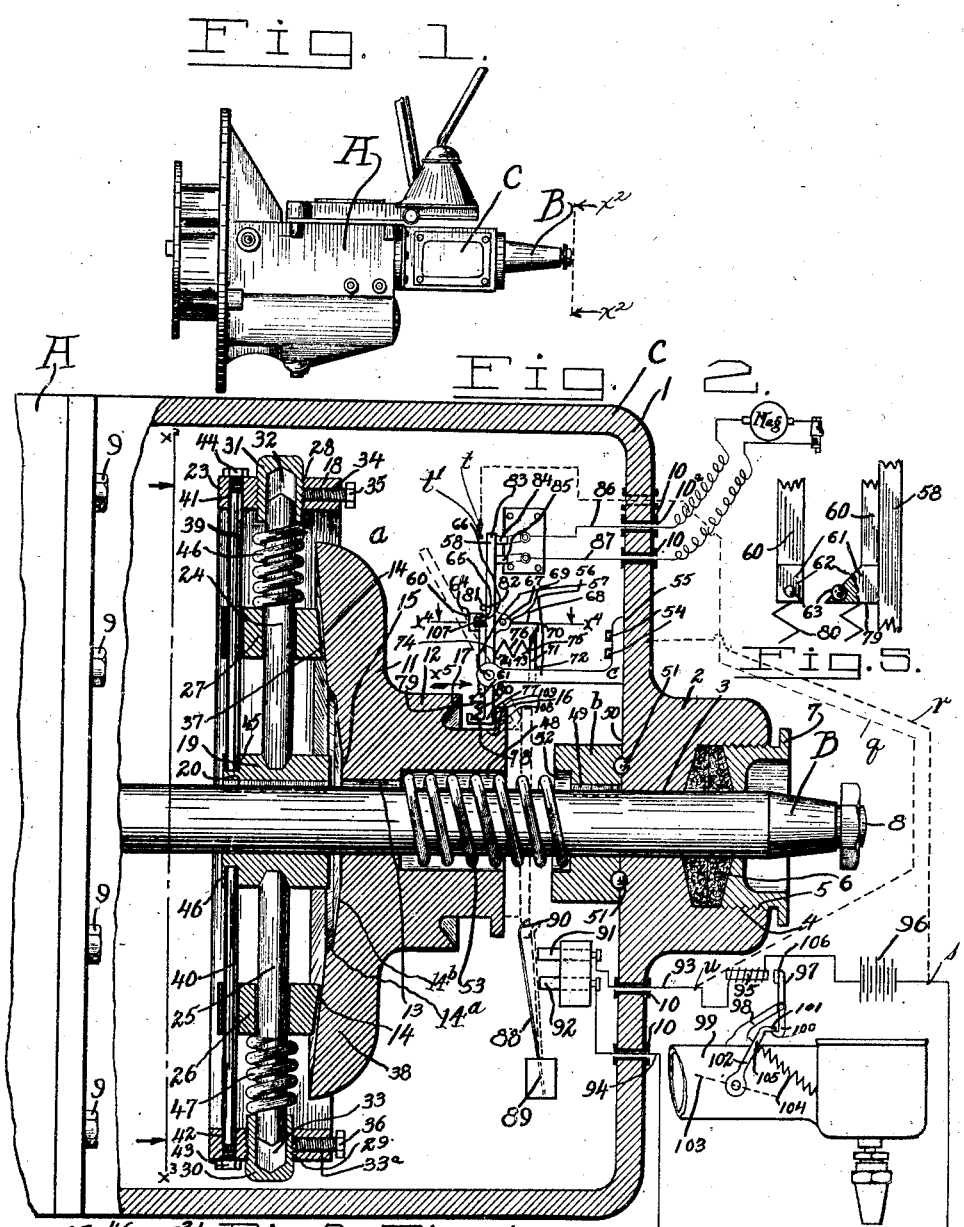

JOHN C. RADOVICH, OF LOS ANGELES, CALIFORNIA.

SPEED-REGULATING DEVICE FOR VEHICLES.

1,410,348.  Specification of Letters Patent.  Patented Mar. 21, 1922.

Application filed June 2, 1920. Serial No. 385,924.

*To all whom it may concern:*

Be it known that I, JOHN C. RADOVICH, a citizen of the United States, residing at Los Angeles, in the county of Los Angeles and State of California, have invented new and useful Improvements in Speed-Regulating Devices for Vehicles, of which the following is a specification.

This invention relates to a speed regulating device for vehicles, and particularly to land vehicles for regulating the rate of travel of same. It has for an object the provision of a device of this character which may be automatically set and which when so set will prevent the vehicle to which it is attached from exceeding a pre-determined rate of travel.

In practicing the invention I provide means which may be attached to the countershaft of the transmission or may be geared to same, and which means operates a trip when a pre-determined speed is exceeded. If, for instance, the law was such that the speed on all county roads should not exceed thirty-five miles per hour, the device or means is provided with adjusting nuts that will so regulate same as to shut off the fluid supply used in energizing the prime mover of the vehicle. It would be necessary after this happened for the vehicle to come to a stop, at which time the device or means would restore the fluid supply means to a normal condition and allow the vehicle to again be operated at any speed between one mile per hour and thirty-five miles per hour. The device is also provided with a casing which may be so locked by state officials or the police of a city, so that tampering with the internal mechanism would be impossible after the adjustments essential to or stipulated by city ordinance had been complied with.

The invention has for further objects the provision of an improved device for regulating the speed of a vehicle, which will be superior in point of relative simplicity and inexpensiveness, taken in conjunction with utility, durability and general efficiency and serviceability.

With the above and other objects in view, the invention consists in the novel and useful provision, formation, construction, combination, association and inter-relation of parts, members and features, all as disclosed in the accompanying drawing, and described in the following specification, and finally pointed out in claims.

In the drawing:

Figure 1 is a fragmentary side elevation of a transmission casing and transmission shaft and showing an improved device for regulating the speed of vehicles attached to the transmission shaft;

Figure 2 is a fragmentary cross sectional view of the speed regulating device shown in position in Figure 1, and taken on the line $x^2$—$x^2$, Figure 1, looking in the direction of the appended arrows;

Figure 3 is an end elevation of the device shown in Figure 2 and taken on the line $x^3$—$x^3$, Figure 2, looking in the direction of the appended arrows;

Figure 4 is a fragmentary end elevation of a trip arrangement used in connection with the device, and taken on the line $x^4$—$x^4$, Figure 2, looking in the direction of the appended arrows; and Figure 5 is a fragmentary front and side elevation of bearing means used in connection with the trip arrangement and looking in the direction of the arrow $x^5$ Figure 2.

Corresponding parts in all the figures are designated by the same reference characters.

Referring with particularity to the drawing, A designates the transmission or the gear box which contains speed change gears, B a transmission jack shaft, and C a device for regulating the speed of a vehicle D which is associated with the transmission casing A and the transmission jack shaft B, and E an engine or prime mover—all of which elements are used in practicing one embodiment of the invention.

The speed regulating device C includes a casing 1 provided with a hub portion 2. The jack shaft B extends through the casing and through the hub 2, as shown at 3. A portion of the hub, as 4, is channeled and threaded as at 5. A packing gland or dust ring 6 is placed in said channeled portion, and a cap nut 7 is screwed upon the threaded portion 5 and bears against the gland 6. The end portion as at 8 of the jack shaft B is arranged to accommodate a universal joint, not shown, which joint also connects with a propeller shaft, not shown. The casing C may be attached to the transmission casing A as by means of bolts and nuts 9. The casing is also provided with a plurality of perforations 10 having insulation means 10ª therein. The purpose of the perforations 10 will be described later.

Contained within the casing C is a mechanism used for regulating the speed of a vehicle, which mechanism comprises in the main a particular form of governor *a*. The governor *a* includes a disc 11 provided with a hub portion 12 and the disc is keyed to the jack shaft B as at 13 so that the disc may turn with the shaft. An end portion of the disc as at 14 is inclined for a space and which incline extends as far as the perimeter of the disc 11. As the inclined portion 14 nears the shaft B there is a slight jog inwardly as at 14ª, and then a further incline 14ᵇ which corresponds to the incline 14. A portion as 15 which is straight or vertical, joins with the incline portion 14ᵇ and extends as far as the periphery of the jack shaft B. The hub portion of the disc 11 is provided with an annular groove 16, which groove 16 has one of its side faces as 17 inclined. A wheel 18 is placed adjacent the inclined portion of the disc 11, which wheel 18 is provided with spoke members. A hub 19 of the wheel 18 is keyed to the jack shaft B as at 20, so that the wheel may turn with the jack shaft B and in addition be held in the same position at all times. Certain of the spokes as 21 and 22 are integrally formed with a rim 23 of the wheel 18 and with the hub 19, both of said spokes 21 and 22 being in opposed relation for counter-balancing effect. The wheel 18 is likewise provided with two other spoke members 24 and 25 also arranged in opposed relation and substantially at right angles to the spoke members 21 and 22. The spokes 24 and 25 may be termed the work-carrying members, for mounted upon said spokes are shoes 26 and 27. The rim 23 of the wheel 18 is provided with threaded perforations 28 and 29, which perforations are directly over the outer ends of the spokes 24 and 25. Threaded nuts 30 and 31 are screwed within the perforations 28 and 29. Each of the nuts 30 and 31 is internally recessed as at 32 and 33, respectively, so that when the nuts 30 and 31 are revolved they may accommodate in their recessed portions the end or end portions of the spokes 24 and 25 respectively. The rim 23 is likewise provided with transverse threaded perforations 33ª and 34 which communicate with the threaded perforations 28 and 29, and screw means 35 and 36 turn within said perforations and abut against the outer surface of the nuts 30 and 31 to prevent their being turned. Upon the spokes 24 and 25 are placed, as has been described, the shoe members 26 and 27. The shoe members 26 and 27 comprise blocks provided each with an inclined face 37 and 38 respectively, and which inclined faces 37 and 38 are inclined complementarily with the inclined face 14 of the disc 11. To prevent the blocks from turning or twisting, guide rods 39 and 40 are provided. The guide rods are accommodated within perforations 41 and 42 located in the rim 18. A portion of the perforations is threaded to accommodate screws 43 and 44 for retaining the rods in position. The lower portions of the guide rods are accommodated within perforations 45 and 46 of the hub member 19. Yielding means 46 and 47 comprising in the main helical springs, surround the spokes 24 and 25, one for each spoke. The yielding means 46 and 47 are placed between the end members 30 and 31 and the shoes 26 and 27.

The disc 11 is provided with an enlarged channel portion 48 located in the hub portion 12. An annular ring member *b* is keyed as at 49 to the jack shaft B and an end portion of the ring member *b* abuts against a surface portion 50 of the inner surface of the casing C. As the ring member *b* turns with the jack shaft B and the casing C remains stationary, thrust bearings 51 act between the two surfaces to render friction negligible. The ring *b* is recessed as at 52. Surrounding the jack shaft B is a helical spring member or yielding means 53, and which yielding means is accommodated within the recessed portion 48 of the disc 11 and the recessed portion 52 of the ring *b*. The function of the yielding means 53 is to force the disc 11 so that one or the other of the inclined faces as 14 and 14ᵇ will engage with the inclined faces of the shoe members 26 and 27. An L-shaped bracket member or supporting means *c* is detachably held by means of screws 54 to a portion of the inner surface of the casing C, as at 55. An end 56 of the bracket is provided with a bearing 57 and pivotally mounted thereon is an arm or lever 58. The arm or lever 58 is provided with a channeled portion 59 and within the channeled portion and slidably retained therein is a member 60. In Figure 4 the channeled portion 59 is shown as V-shaped, while the member 60 is correspondingly V'd so that it may be retained within the channeled portion 59; however, I do not wish to limit myself to this particular construction, as any other method of retaining the member 60 with relation to the lever 58 would be satisfactory.

The member 60 is provided with an angularly-directed and outstanding head 61, which head has an inclined face 62 provided with a bearing 63. The opposite end of the member 60 is U-shaped, as at 64, the free end of which, as 65, is close to a surface 66 of the lever 58, for reasons to be described. The lever 58 is provided with a lug or ear 67 and a catch or trip means or lever 68 is pivotally attached as at 69 to said ear 67. An end as 70 of the lever 68 is angularly directed, and which angularly directed end cooperates with an upstanding rod 71 mounted upon the bracket c as at 72. An end portion 73 of the rod 71 is inclined as shown. Intermediate the lever 58 as at 74 and the rod 71 as at 75, is a yielding means 76. The lever 58 beneath the pivot point 56, is bracketed, or in other words provided with an angularly directed end portion 77. Between an inner surface 78 of the portion 77 and a face 79 of the head 61 of the member 60 is placed a yielding means 80. The yielding means 80 normally urges the member 60 upwardly, and to limit the upward movement of the member 60 a pin 81 is placed in the lever 58 as at 82. An upper end portion 83 of the lever 58 normally closes an electrical circuit associated with the magneto and the spark plugs, by engaging two spacedly arranged electrical contact points 84 and 85. Electrical conductors 86 and 87 pass from said contact points 84 and 85 respectively through certain of the perforations 10 to the magneto and spark plugs. The insulation $10^a$ in each of the perforations 10 serves to prevent any short-circuiting by causing a leak through the casing C.

There may also be provided within the casing C a means for shutting off the gasoline supply. To accomplish this a wafer spring 88 is fastened near one end as at 89 to a portion of the casing C and if the disc member 11 should move as shown by the dotted lines in Figure 2, it would engage an end as 90 of the wafer 88 and cause it to contact with the contact points 91 and 92. Electrical conductors 93 and 94 connect with the contact points 91 and 92 and pass through certain of the insulated perforations 10. The electrical conductor 93 is associated with an electrical magnet 95 and from thence to energy supply means, such as batteries 96, and from a pole of said batteries back through the electrical conductor 94. If the wafer 88 should contact with the two contact points 91 and 92 at the same time, the electrical magnet 95 would be energized and when so energized it would draw a lever locking hook 97 toward said magnet. The lever locking hook is pivotally mounted upon a bracket 98, which bracket is in turn mounted upon a portion of an intake manifold 99. A hook portion 100 of the lever hook cooperates with a hook portion 101 of a hook latch 102 pivotally mounted on the intake manifold 99. Within the intake manifold is a butterfly valve 103, which is shown in dotted lines, which butterfly valve 103 cooperates with the hook latch 102 and will turn within the manifold when the hook latch 102 revolves. Yielding means 104 is connected as at 105 to a portion of the hook latch 102 and the other end to some portion of the intake manifold 99. Thus when the electrical magneto 95 is energized an end 106 which is provided with an iron cap or similar metal which is attracted by magnetism, will be drawn toward the electric magnet 95 allowing the hook 100 and the latch 101 to separate, whereupon the yielding means 104 will draw the hook latch downwardly revolving the butterfly valve 103 within the intake manifold 99, so that the gasoline supply is shut off.

Another method of shutting off the gasoline supply is shown by the dotted lines in Figure 2, which method dispenses with the wafer spring 88, and possibly it would be more satisfactory as the wafer spring might vibrate. Referring to Figure 2 and to the dotted lines which illustrate electrical conductors as q and r, it will be seen that the electrical conductor r is grounded to the casing C and joins with the electrical conductor 94 as at s on one side of the energy supply means 96. The other electrical conductor q passes through an insulated perforation and joints with a gravity-controlled pivotally mounted lever. The method of operation of this particular arrangement will be described further on.

The operation is as follows:

As has been described, the yielding means 53 acting between the ring b and the disc 11 normally tends to force the disc 11 along the jack shaft B toward the shoes 26 and 27. When the motor is running and the gears shifted in the gear box or transmission A the jack shaft B will commence to turn and when this occurs each of the shoes 26 and 27 will tend to be thrown outwardly by centrifugal force and the inclined faces 37 and 38 of the shoes will commence to creep upward the inclined face 14 of the disk 11, but they are retarded in their action by the yielding means 46 and 47. Thus the faster the jack shaft B revolves the further outwardly will be forced the shoes 26 and 27, in accordance with the well-known laws of physics. This outward movement of the shoes will tend to force the disc along the jack shaft B and this action will be opposed by the yielding means 53. If we suppose that the governor a has been so regulated and the caps 30 and 31 turned so that the yielding means 46 and 47 oppose movement of the shoes 26 and 27, up to a certain speed, along the inclined face 14 of the disc 11, further movement will allow the inclined head 61 to contact with the inclined face 17 of the annular groove 16 located in the hub 12 of the disc 11. In reality the ball bearing 63 located in the inclined face 61 will contact with the inclined side 17, and the more the disc 11 moves, as shown by the dotted lines, the further down will the member 60 be drawn because of the inclined side 17. The U-shaped end 64 will of course move with the member 60 and pull downwardly upon an end 107 confined within the same.

If the member 60 moves downwardly a sufficient distance the end 70 of the lever 68 will trip from the end 73 of the rod 71, and when this occurs the lever 58 will be thrown quickly from the contact points 84 and 85, due to the spring 76. It is necessary that the movement of the lever arm 58 away from the contact points 84 and 85 should be as quick as possible, so that no arcing will occur. This of course breaks the circuit of the magneto and spark plugs and the engine will immediately stop running. As soon as the speed of the vehicle diminishes the jack shaft B will not revolve as rapidly, and consequently the centrifugal force will diminish and the shoes 26 and 27 will tend to move toward the hub 19 because of the spring action downwardly upon same, and in addition the yielding means 53 will tend to force the disc 11 again inwardly. The disc 11 is so constructed that as the shoes 26 and 27 move downwardly upon the carriers 24 and 25 the inclined faces of the shoes will at all times press over against the inclined face 14 of the disc or the inclined face $14^b$. It will be noted that the jog $14^a$ dividing the two inclined faces 14 and $14^b$ is arranged so that when each of the shoes have moved downwardly a sufficient distance the shoes will each drop suddenly into or upon the inclined portion $14^b$ because of the spring action of the means 53. This of course gives the disc a "kicking" action, and when this occurs a side 108 of the annular groove 16 is caused to contact with a face 109 of the lever 58, thus causing the portion 83 of the lever 58 to again make contact with the contact points 84 and 85. The end 73 of the rod 71 being inclined will allow the angularly disposed end 70 of the lever 68 to slide upwardly and hook over the end of the rod 71. Hence the device is self-restoring, but it will be observed that it will be necessary normally to stop the vehicle in its forward travel before the governor will again set itself.

It might not always be possible to associate the governor $a$ upon the jack shaft B, and thus a train of gears might be interposed between the jack shaft B and an independent counter-shaft provided with a gear within the casing C and upon which the governor elements would be mounted. In some self-propelled vehicles the transmission is located on the rear axle and it would be necessary to locate the governor $a$ so that it could regulate the turning movement of the axle where the jack shaft of the transmission joins the differential. In other words, it is at all times necessary that the governor $a$ be so placed in relation to the driven parts of the vehicle that racing the engine would not affect the same. The inventor is aware that there is a device on the market which is associated with the prime mover or the engine for preventing a driver from leaving the vehicle standing with the engine running or from racing the engine, and which device automatically shuts off the fluid supply after the vehicle has stood a certain length of time. However, the device now on the market principally regulates and shows the amount of gasoline used and is for the purpose of preventing the drivers from joy riding, etc. However, the present invention is intended to prevent speeding of a vehicle beyond certain definite limits, as provided by law. Thus the governor $a$ must be so associated with the vehicle as to not be affected by a racing of the engine, such as when the gears are shifted into low, but rather to be so associated with the vehicle as to regulate the translational speed of same.

It will be understood of course that the governor is in reality one form of speedometer. By placing a dial with a pointer playing over same it would be possible to utilize this instrument so that it would register speeds of vehicle travel and at the same time act in the capacity as stated. In fact, this particular form of governor and the functions it is intended to perform may be associated with the flexible shaft of the ordinary speedometer used on the instrument board of a self-propelled vehicle. The inventor does not wish to confine his invention so that it would always have to be placed upon the jack shaft of the transmission, but wishes it to be understood that a device of this character may be placed anywhere upon a vehicle, as long as it cooperates with moving parts which are directly fixed by the rate of travel of a vehicle, and not the rate of travel of any of the propulsive elements such as the motor. It will be obvious that if a device of this character were coupled to the engine shaft, when the gearing was shifted in say, first position, the engine would race while the vehicle would slowly creep along. The moment the racing of the engine occurred this device would shut off the source of energy supply. The inventor makes these statements as he wishes to be understood as supplying a device to regulate the forward and backward speed of any vehicle to which it is attached. In place of using the wafer spring 88, as has been described, when the lever 83 breaks contact with the contact points 84 and 85 and assumes the dotted line position shown in Figure 2, the lever 83 will contact with a head $t^1$. As the lever 83 is grounded through the bracket $c$ to the casing C, an electrical path will be set up through the conductors $q$ and $r$, and when such electrical path is set up the trip elements such as 97 and 102 will be operated and the butterfly valve 103 closed in the manifold. Of course the electrical conductor $q$ would have to connect with the conductor 93 at some such point as $u$, in order to take advantage of an electrical path through the batteries 96 and the magnet 95.

It is obvious that many changes and variations and modifications may be made in departure from the particular description and the showing of the accompanying drawing, in adapting the invention to varying conditions and requirements of use and service, without departing from the true spirit of the invention.

Having thus disclosed my invention, I claim and desire to secure by Letters Patent:

1. In combination with means for operating a vehicle of means adapted to operate responsive to changes in speed of the vehicle to render said operating means inoperative; said second named means including a governor and means actuated thereby to render said operating means inoperative; said governor including a disc provided with a hub formed with an annular groove therein, a face of which is inclined; and means actuated thereby including a pivoted lever and a member slidably mounted thereon; a trip associated with said member and adapted to operate responsive to movement of said member.

2. In combination with means for operating a vehicle of means adapted to operate responsive to changes in speed of the vehicle to render said operating means inoperative; said second named means including a governor and means actuated thereby to render said operating means inoperative; said governor including a disc formed with an inclined face, a shaft upon which said disc is concentrically mounted for rotation with and co-axial movement thereon, and a shoe having an inclined face for cooperation with the inclined face of the disc to limit the co-axial movement of the same; said disc being provided with a hub formed with an annular groove, a face of which is inclined; and means actuated thereby including a pivoted lever and a member slidably mounted thereon; a trip associated with said member and adapted to operate responsive to movement of said member.

3. In combination with means for operating a vehicle of means adapted to operate responsive to changes in speed of the vehicle to render said operating means inoperative; said second named means including a governor and means actuated thereby to render said operating means inoperative; said disc being provided with a hub formed with an annular groove, a face of which is inclined; and means actuated thereby including a pivoted lever, and a member slidably mounted thereon; a trip associated with said member and adapted to operate responsive to movement of said member; said member being provided with an enlarged head, a face of which is inclined, and said inclined face cooperating with the inclined face of the annular groove at certain speeds of the vehicle to move the same and operate the trip, thus rendering the means for operating the vehicle inoperative.

4. In combination with means for operating a vehicle, of means adapted to operate responsive to changes in speed of the vehicle to render said first means inoperative when a pre-determined vehicle speed is exceeded; said first means remaining inoperative until the vehicle has approximately stopped movement, whereupon said second means automatically restores said first means to normal condition preparatory for further operation of the vehicle.

5. In combination with ignition means of an internal combustion engine for operating a vehicle, of means adapted to operate responsive to changes in speed of the vehicle to render said ignition means inoperative when a pre-determined vehicle speed is exceeded; said ignition means remaining inoperative until the vehicle has approximately stopped movement, whereupon said second named means automatically restores said ignition means to normal condition preparatory for further operation of the vehicle.

In testimony whereof, I have signed my name to this specification in the presence of two subscribing witnesses.

JOHN C. RADOVICH.

Witnesses:
EDNA TURNER,
J. CALVIN BROWN.